No. 741,998. PATENTED OCT. 20, 1903.
G. J. BOOTH.
DRIVING BELT.
APPLICATION FILED AUG. 31, 1903.
NO MODEL.
FIG. 1
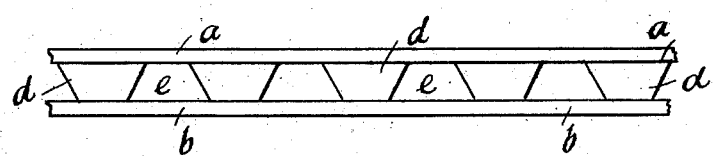
FIG. 2  FIG. 3
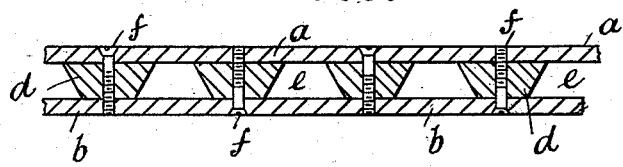 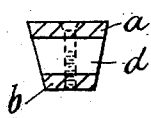
FIG. 4
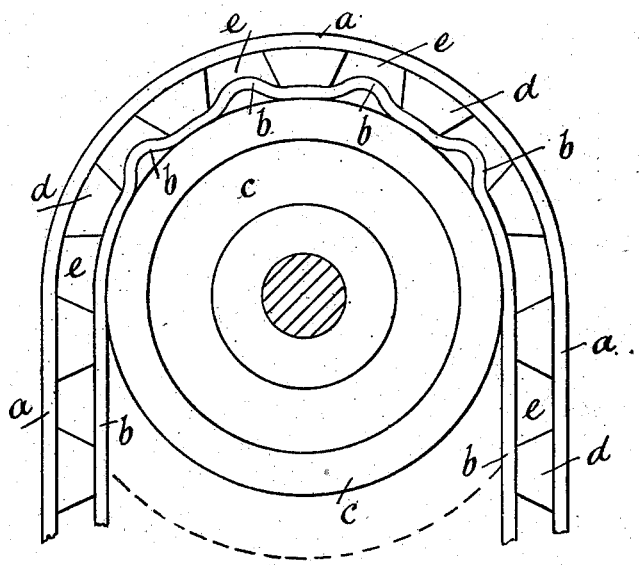
WITNESSES:
F. W. Wright
P. W. Buckhead
INVENTOR
George James Booth
BY
Howson & Howson
HIS ATTORNEYS.

No. 741,998. Patented October 20, 1903.

UNITED STATES PATENT OFFICE.

GEORGE JAMES BOOTH, OF ROCHDALE, ENGLAND.

DRIVING-BELT.

SPECIFICATION forming part of Letters Patent No. 741,998, dated October 20, 1903.

Application filed August 31, 1903. Serial No. 171,441. (No model.)

*To all whom it may concern:*

Be it known that I, GEORGE JAMES BOOTH, a subject of the King of Great Britain and Ireland, residing at Railway Leather Works, Rochdale, in the county of Lancaster, England, have invented new and useful Improvements Applicable to Driving-Belts, of which the following is a specification.

My invention is applicable to such machine-driving belts as are composed of more than one ply or layer of leather or other suitable material fastened together by means of screws, rivets, or otherwise at short intervals throughout their length or a combination of two or more kinds of material or materials—that is, where such layers cannot be used to run loosely on each other—and it relates more especially to such belts as are required to work around V-grooved pulleys of small diameter—such, for instance, as the belts with V-shaped edges which are used for driving motor-bicycles and for like purposes.

The object of my invention is to relieve the internal strains which are set up under such circumstances when a thick compound belt made of two or more plies or layers runs round a pulley of small diameter, which strains not only tend to loosen the fastenings by which the several layers are held together and to generally disintegrate the belt, but also occasion loss of tractive power, owing to the force which is wasted in bending a thick belt. Further, the existence of these strains is prejudicial to the "grip" of the belt on the pulley, and such grip can only be obtained by working the belt so tight as to set up an undue strain on the bearings, causing an unnecessary increase of wasteful wear and a corresponding additional waste of power.

Take, for example, a V-edged motor-bicycle belt usually made half an inch in thickness or depth and running round a small pulley of an inner curve of, say, three inches and a half. Now it is evident that as the belt is half an inch thick or deep the curve of the outer surface must be one inch greater in diameter than the inner one—*i. e.*, four inches and a half—and as the difference between the circumference of a three-and-a-half-inch circle and one of four and a half inches is about three inches and one-eighth and as the contact of the belt with the pulley is about two-fifths of the circumference it is clear that while the belt is passing round that part of the circumference the difference in length between the outer and inner curves of the belt must be two-fifths of three inches and one-eighth or one inch and a quarter, and this in an average length of five inches—that is, two-fifths of the average circumference—the inner layer having to be compressed and the outer layer stretched to a considerable degree, thus setting up severe internal strains which more or less rapidly disintegrate and destroy the belt and at the same time cause faulty driving.

It is found by experiment that while there is some extension of the outer surface of the belt when passing round the pulley there is a much greater amount of buckling or crumpling action in the under layer or layers, and hence a straining disintegrating motion is constantly going on in the belt itself in less degree, but analogous to that produced by bending and breaking a rod, piece of wire, or the like.

The nature of my said invention and the manner in which the same is to be performed or carried into practical effect will be readily understood on reference to the annexed sheet of drawings, marked with letters of reference corresponding with those in the following explanation thereof.

Figure 1 on the drawings is a side or edge view of a compound driving-belt made according to my invention. Fig. 2 is a longitudinal section, and Fig. 3 a transverse section, of the same. Fig. 4 is an edge view illustrating the action of the belt in passing round a pulley of small dimensions.

This belt is shown as composed of only two layers, an outer one *a* and an inner one *b* and in view of the fact that in passing round a small pulley, such as *c*, Fig. 4, a thick belt crumples up on the inner side *a* more than it stretches on the outer side I relieve the consequent internal strains by placing between the two layers *a* and *b* distance or separating pieces *d* at suitable intervals apart, leaving between them free or open spaces *e*, in which the inner layer *a* can crumple up, as shown, so as to adjust itself to the alteration of length required without resistance other than such as each layer itself presents. The two layers $a$ and $b$ of the belt and the separating-pieces $d$ may be made of leather, woven fabric, or other suitable material or combination of materials, and the separate layers $a$ and $b$, together with the separating-pieces or distance-pieces $d$, may be all united together by means of screws $f$, as shown, or by means of metal rivets, or by both screws and rivets, or by stitching or other suitable means of fastening the same together, and the said fastenings not having to withstand the severe internal strains present in the ordinary belt can be used lighter, so that the materials of which the compound belt is made will be displaced in a less degree. I would also remark that, although I have for the sake of illustration shown the compound belt formed of only two layers, I reserve to myself the right to make the same with any convenient number of superposed layers, with intervening separating-pieces, and of any convenient breadth, according to the use to which the compound belt is to be applied, and although, as before stated, when the belt is to be used in connection with V-grooved pulleys I make the same with suitable sloping edges, as shown at Fig. 3, so as to obtain a maximum side grip, I propose also to make flat belts upon the same principle.

By the use of my invention I am enabled to relieve the strains above referred to and to impart greater pliability to the belt, with the following results: first, better driving-grip, and consequently less slip; second, less friction on the bearings and consequent economy of power; third, less stretch; fourth, longer life of the belt.

I claim as my invention—

Compound driving-belts, comprising superposed layers of belt material, distance-pieces placed at suitable intervals between such layers separating them from each other, and the whole united by suitable means of connection, passing through the different layers and through the separating or distance pieces and uniting them together into one flexible compound belt, substantially as described.

In testimony whereof I have signed my name to this specification in the presence of two subscribing witnesses.

GEORGE JAMES BOOTH.

Witnesses:
JNO. HUGHES,
J. ERNEST HUGHES.